United States Patent
Cai et al.

(10) Patent No.: US 8,804,596 B2
(45) Date of Patent: *Aug. 12, 2014

(54) ARCHITECTURE FOR TERMINATION AT ACCESS DEVICE

(75) Inventors: Zhijun Cai, Irving, TX (US); Rose Qingyang Hu, Irving, TX (US); Yi Yu, Irving, TX (US); Mo-Han Fong, Kanata (CA); Chandra S. Bontu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 1106 days.

This patent is subject to a terminal disclaimer.

(21) Appl. No.: 12/573,015

(22) Filed: Oct. 2, 2009

(65) Prior Publication Data

US 2011/0080892 A1  Apr. 7, 2011

(51) Int. Cl.
*H04B 7/14* (2006.01)
*H04W 36/00* (2009.01)

(52) U.S. Cl.
USPC .......... 370/315; 455/436; 455/439; 455/442; 455/443

(58) Field of Classification Search
USPC .......... 370/315; 455/436, 439, 442, 443, 444
See application file for complete search history.

(56) References Cited

U.S. PATENT DOCUMENTS

| | | |
|---|---|---|
| 2002/0078135 A1 | 6/2002 | Venkatsubra |
| 2007/0072604 A1 | 3/2007 | Wang |
| 2007/0079207 A1 | 4/2007 | Seidel et al. |
| 2008/0112365 A1 | 5/2008 | Kwun et al. |
| 2008/0273537 A1 | 11/2008 | Meylan et al. |
| 2008/0307524 A1 | 12/2008 | Singh et al. |
| 2009/0168788 A1 | 7/2009 | Den et al. |
| 2009/0196252 A1 | 8/2009 | Fischer |
| 2010/0177739 A1 | 7/2010 | Huang |
| 2010/0265915 A1 | 10/2010 | Sun et al. |
| 2010/0322197 A1 | 12/2010 | Adjakple et al. |
| 2011/0002304 A1* | 1/2011 | Lee et al. .................. 370/331 |
| 2012/0033641 A1 | 2/2012 | Huang |
| 2012/0039302 A1 | 2/2012 | Chun et al. |
| 2012/0051349 A1* | 3/2012 | Teyeb et al. .................. 370/338 |
| 2012/0142357 A1 | 6/2012 | Aminaka |
| 2013/0058272 A1 | 3/2013 | Adjakple et al. |

FOREIGN PATENT DOCUMENTS

| | | |
|---|---|---|
| EP | 0986222 A2 | 3/2000 |
| EP | 1422883 A1 | 5/2004 |
| EP | 1519519 A1 | 3/2005 |

(Continued)

OTHER PUBLICATIONS

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

(Continued)

*Primary Examiner* — Brandon Renner
*Assistant Examiner* — Abdelnabi Musa
(74) *Attorney, Agent, or Firm* — Conley Rose, P.C.; J. Robert Brown, Jr.

(57) ABSTRACT

A method is provided for handing over a user equipment (UE). The method includes a donor access node with which the UE is in communication via a relay node receiving UE context information from the relay node. The method further includes the donor access node using the UE context information to identify data packets that belong to the UE.

20 Claims, 7 Drawing Sheets

(56) References Cited

FOREIGN PATENT DOCUMENTS

| EP | 2184935 A1 | 5/2010 |
|---|---|---|
| WO | 2006090269 A1 | 8/2006 |
| WO | 2006138046 A2 | 12/2006 |
| WO | 2007019672 A1 | 2/2007 |
| WO | 2007092617 A2 | 8/2007 |

OTHER PUBLICATIONS

3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.
NTT Docomo; 3GPP TSG-RAN3 #64; Title: "Relay Requirements & Use Case Study in LTE-Advanced;" R3-091228; San Francisco, USA; May 4-8, 2009; 5 pgs.
Panasonic; 3GPP TSG RAN WG1 Meeting #54; Title: "Discussion on the Various Types of Relays;" R1-082397; Warsaw, Poland; Jun. 30-Jul. 4, 2008; 6 pgs.
PCT International Search Report; PCT Application No. PCT/US2010/039236; mailed Aug. 26, 2010; 3 pgs.
PCT Written Opinion of the International Searching Authority; PCT Application No. PCT/US2010/039236; mailed Aug. 26, 2010; 6 pgs.
PCT International Search Report; PCT Application No. PCT/US2010/039257; mailed Aug. 25, 2010; 3 pgs.
PCT Written Opinion of the International Searching Authority; PCT/US2010/039257; mailed Aug. 25, 2010; 4 pgs.
RAN3 LTE-A Rapporteur; 3GPP TSG RAN WG3 Meeting #64; Title: "LTE-A RAN3 Baseline Document;" R3-091447; San Francisco, USA; May 4-8, 2009; 12 pgs.
Texas Instruments; 3GPP TSG RAN WG2 #66; Title: "On the Design of Relay Node for LTE-Advanced;" R2-093064; San Francisco, USA; May 4-8, 2009; 4 pgs.
Hu, Rose Qingyang, et al.; U.S. Appl. No. 12/819,138; Title "Mechanisms for Data Handling During a Relay Handover with S1 Termination at Relay"; Filing Date: Jun. 18, 2010.
Hu, Rose Qingyang, et al.; U.S. Appl. No. 12/819,139; Title "Mechanisms for Data Handling During a Relay Handover with S1 Termination at Evolved Universal Terrestrial Radio Access Network Access Node"; Filing Date: Jun. 18, 2010.
Office Action dated Apr. 11, 2012; U.S. Appl. No. 12/573,010 filed Oct. 2, 2009; 28 pages.
Office Action dated Jun. 29, 2012; U.S. Appl. No. 12/573,014 filed Oct. 2, 2009; 34 pages.
Foreign Communication from Counterpart Application; Application No. 10184837.2-1249; EESR mailed Nov. 30, 2010; 7 pgs.
Foreign Communication from Counterpart Application; Application No. 10184900.8-1249; EESR mailed Dec. 6, 2010; 7 pgs.
Foreign Communication from Counterpart Application; Application No. 10184508.9-1249; EESR mailed Dec. 6, 2010; 7 pgs.
Cai, Zhijun, et al.; U.S. Appl. No. 12/573,010; Filing Date: Oct. 2, 2009; Title: Handover Mechanisms with Synchronous PDPC Protocol Under Various Relay Architectures.
Cai, Zhijun, et al.; U.S. Appl. No. 12/573,014; Filing Date: Oct. 2, 2009; Title: System and Method for Handover Between Relays.
3GPP TS 36.331v9.0.0; 3rd Generation Partnership Project; Technical Specification Group Radio Access Network; Evolved Universal Terrestrial Radio Access (E-UTRA) Radio Resource Control (RRC); Protocol Specification; Release 9; Sep. 2009; 213 pgs.
3GPP TR 36.912v0.2.0; 3rd Generation Partnership Project; Technical Specification Group Radio Access Network; Feasibility Study for Further Advancements for E-UTRA (LTE-Advanced); Release 9; Aug. 2009; 31 pgs.
3GPP TS 36.300v8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Mar. 2009; 157 pgs.
3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.
NTT Docomo, Inc.; Title: Report of email discussion [66#22] on Relay Architecture; R2-093972; 3GPP TSG-RAN WG2 #66bis; Los Angeles, USA; Jun. 29-Jul. 3, 2009; 30 pgs.
Ericsson; Title: Termination of the S1/X2 Interfaces in Relay Node; R2-092953; 3GPP TSG-RAN WG2 #66; San Francisco, USA; May 4-8, 2009; 4 pgs.
Motorola; Title: Handovers Involving Type-1 Relay Node; R2-093207; 3GPP TSG-RAN-WG2 Meeting #66; San Francisco, USA; May 4-8, 2009; 2 pgs.
NTT Docomo; Title: Relay Requirements & Use Case Study in LTE-Advanced; R2-093281; 3GPP TSG-RAN2#66; San Francisco, USA; May 4-8, 2009; 5 pgs.
NTT Docomo, Inc.; Title: On S1 Termination and Protocol Stack in Relay Architecture; R2-093283; 3GPP TSG-RAN2#66; San Francisco, USA; May 4-8, 2009; 8 pgs.
Qualcomm Europe; Title: Operation of Relays in LTE-A; R1-083191; 3GPP TSG-RAN WG1 #54; Jeju, S. Korea; Aug. 18-22, 2008; 5 pgs.
Motorola; Title: Classification of Relays; R1-083223; TSG-RAN WG1 #54; Jeju, South Korea; Aug. 18-22, 2008; 3 pgs.
Final Office Action dated Jan. 4, 2013; U.S. Appl. No. 12/819,139 filed Jun. 18, 2010; 12 pages.
Office Action dated Oct. 1, 2012; U.S. Appl. No. 12/819,138 filed Jun. 18, 2010; 25 pages.
Office Action dated Aug. 9, 2012; U.S. Appl. No. 12/819,139 filed Jun. 18, 2010; 29 pages.
European Examination Report; Application No. 10732550.8; Oct. 26, 2012; 3 pages.
Notice of Allowance dated Nov. 28, 2012; U.S. Appl. No. 12/573,010 filed Oct. 2, 2009; 23 pages.
Office Action dated Jun. 11, 2013; U.S. Appl. No. 12/819,138 filed Jun. 18, 2010; 24 pages.
Advisory Action dated Jun. 19, 2013; U.S. Appl. No. 12/819,139 filed Jun. 18, 2010; 7 pages.
Notice of Allowance dated Jul. 23, 2013; U.S. Appl. No. 12/819,139 filed Jun. 18, 2010; 6 pages.
Parkvall, Stefan, et al.; "LTE-Advanced—Evolved LTE Towards IMT-Advanced"; IEEE; 2008; 5 pages.
Final Office Action dated Mar. 27, 2013; U.S. Appl. No. 12/819,138 filed Jun. 18, 2010; 28 pages.
Advisory Action dated Mar. 15, 2013; U.S. Appl. No. 12/819,139 filed Jun. 18, 2010; 5 pages.
Final Office Action dated Apr. 11, 2013; U.S. Appl. No. 12/819,139 filed Jun. 18, 2010; 11 pages.
Office Action dated May 1, 2013; U.S. Appl. No. 12/573,014 filed Oct. 2, 2009; 43 pages. (4214-20400).
Canadian Office Action; Application No. 2,716,296; Mar. 21, 2013; 3 pages.
Canadian Office Action; Application No. 2,716,090; Mar. 20, 2013; 3 pages.
Canadian Office Action; Application No. 2,716,295; Mar. 21, 2013; 3 pages.
European Examination Report; Application No. 10184508.9; Feb. 11, 2013; 3 pages.
3GPP TSG RAN WG2 Meeting #66bis; "Joint PDCP Protocols on Uu and Un Interfaces to Improve Type-I Relay Handover"; R2-093735; Jun. 29-Jul. 3, 2009; Los Angeles, USA; 9 pages.
Office Action dated Dec. 31, 2013; U.S. Appl. No. 12/819,138 filed Jun. 18, 2010; 21 pages.
Notice of Allowance dated Nov. 8, 2013; U.S. Appl. No. 12/573,014 filed Oct. 2, 2009; 20 pages.
Canadian Office Action; Application No. 2,764,575; Nov. 6, 2013; 3 pages.
Canadian Office Action; Application No. 2,765,860; Nov. 19, 2013; 2 pages.
Chinese Office Action; Application No. 201080036371.5; Nov. 1, 2013; 16 pages.
Canadian Office Action; Application No. 2,716,296; Jan. 23, 2014; 2 pages.

(56) References Cited

OTHER PUBLICATIONS

Notice of Allowance dated Apr. 25, 2014; U.S. Appl. No. 12/819,138 filed Jun. 18, 2010; 12 pages.

Chinese Office Action as Received in Co-pending Application No. 201080036371.5 on May 19, 2014; 3 pages. (No English translation available).

* cited by examiner

ARCHITECTURE FOR TERMINATION AT ACCESS DEVICE

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or a relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
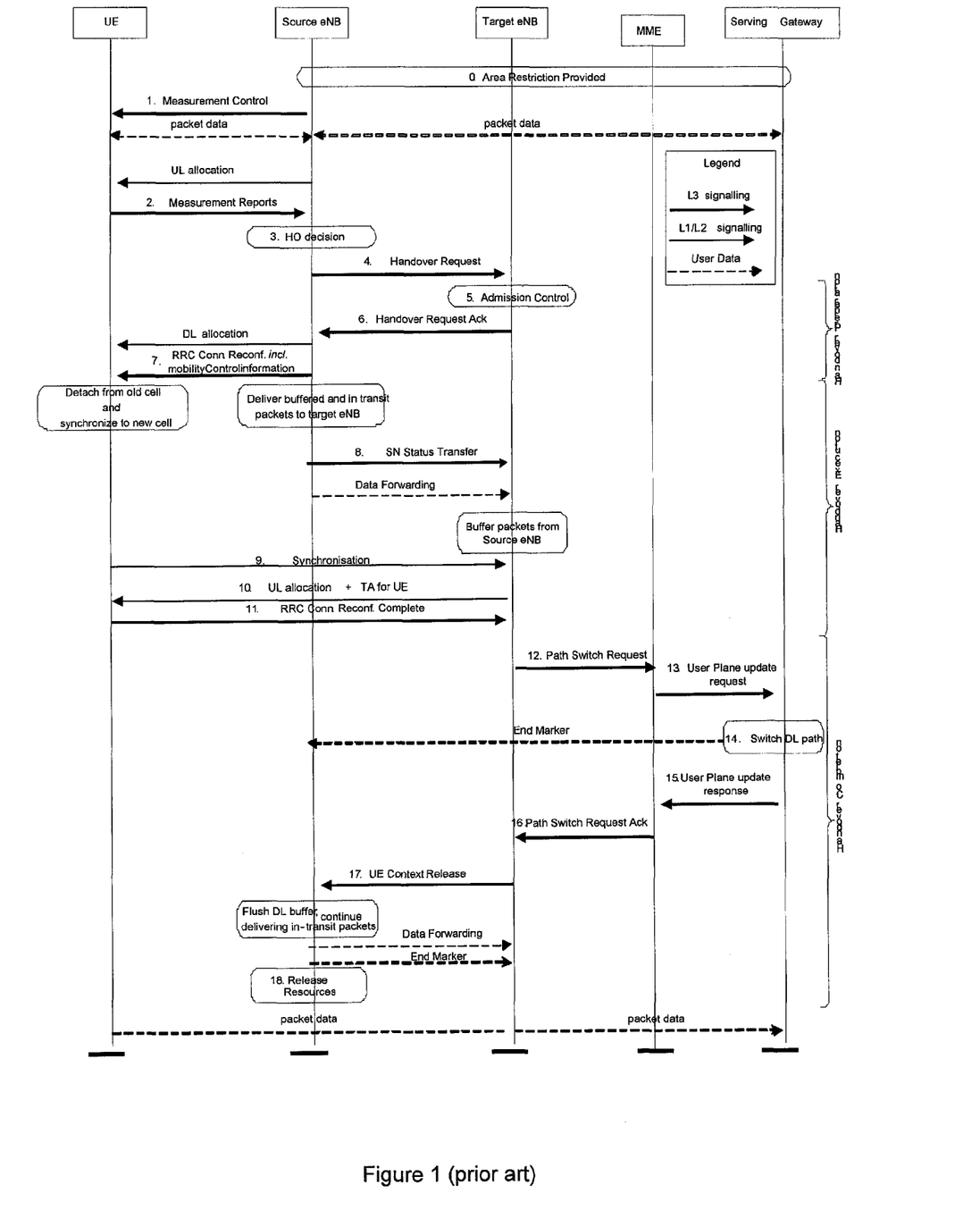
FIG. 1 is a diagram illustrating a handover from one access node to another access node under the prior art.

As a UE moves, it may be handed over from one access node to another access node. FIG. 1 illustrates a procedure defined in 3GPP TS 36.300 for a handover from one access node to another when no relay nodes are present.

The present disclosure deals with wireless telecommunications systems in which a communication path known as the S1 path terminates at a donor access node. Mechanisms are provided whereby a UE can be handed over from a relay node in communication with the donor access node to a target access node that may be in the same cell as the relay node or in a different cell.

Figure 2:
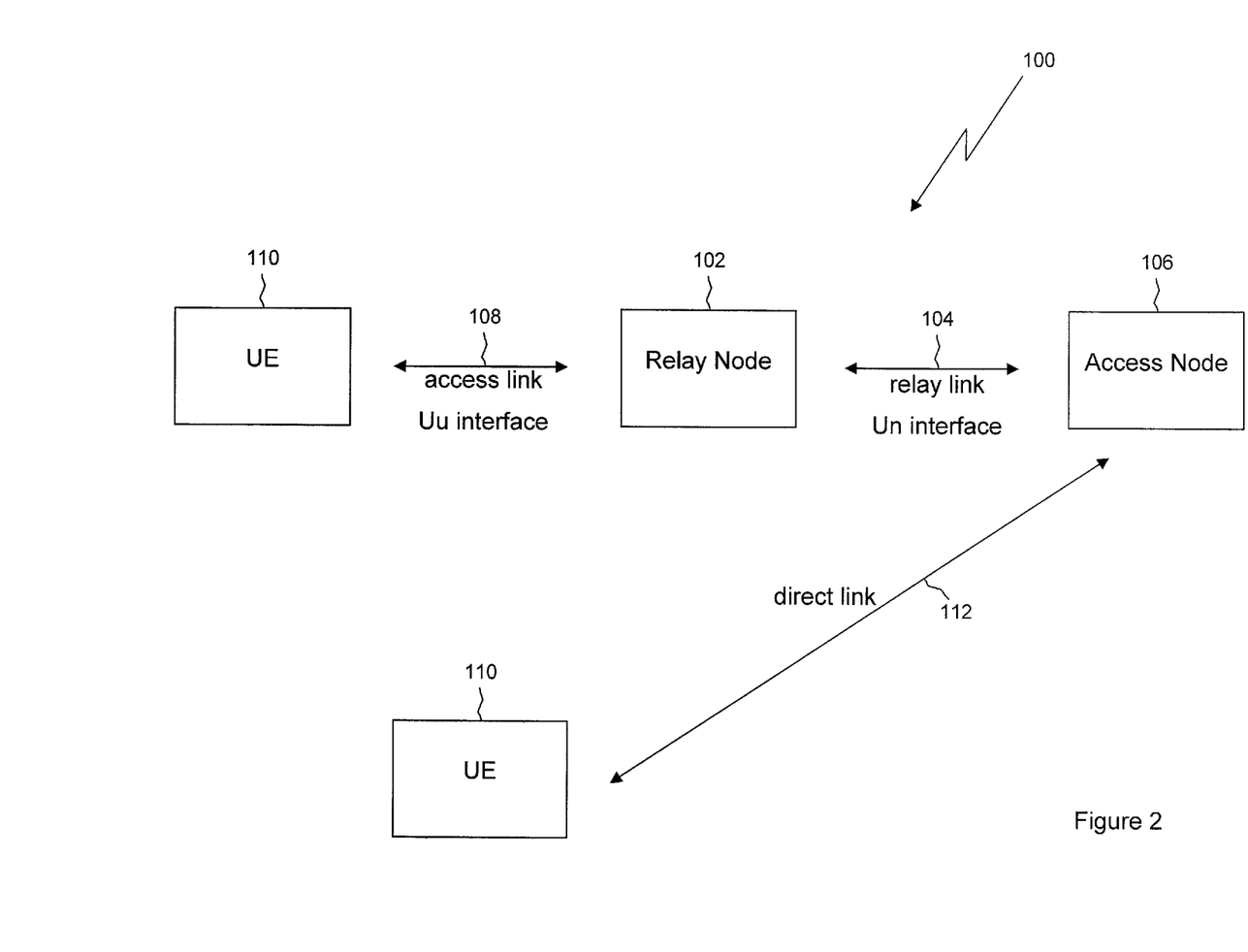
FIG. 2 is a diagram illustrating a wireless communication system that includes a relay node, according to an embodiment of the disclosure.

FIG. 2 is a diagram illustrating a wireless communication system 100 in which embodiments of the present disclosure may be implemented. Examples of the wireless communication system 100 include LTE or LTE-A networks, and all of the disclosed and claimed embodiments could be implemented in an LTE-A network. A relay node 102 can receive a signal from a UE 110 and transmit the signal to an access node 106. In some implementations of the relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The present disclosure is equally applicable in a situation where multiple cells are covered or controlled by one access node. Specifically, the present disclosure is applicable to the case where the UE 110 is moving from a relay node associated with a cell that is controlled by a donor access node to another cell that is not controlled that donor access node.

The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance throughput of a signal within a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and possibly slight delay. A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer three relay nodes.

The radio resource control protocols used by a relay node may be the same as those used by an access node, and the relay node may have a unique cell identity. Relay nodes known as Type 1 relay nodes may have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. A Type 2 relay node can also relay signals to and from LTE-A Release 10 and later UEs. LTE-A Release 10 and later UEs might be aware of the presence of a Type 2 relay node. As used herein, the term "Release 10" refers to any UE capable of following LTE standards later than LTE Release 8 or LTE Release 9, the term "Release 8" refers to any UE capable of following only the LTE standards of LTE Release 8, and the term "Release 9" refers to any UE capable of following the LTE standards of LTE Release 8 and Release 9.

Disclosed herein are methods and systems for supporting relay handover for a UE in communication with an access node via a relay node, where an S1 path for tunneling data packets associated with the UE is terminated at the access node. For instance, the path may be used for tunneling General Packet Radio Service (GPRS) Tunneling Protocol (GTP) packets from an Enhanced Packet Core (EPC) to the access node. This path may be referred to as the S1 path, and a handover as described herein may include an S1 path switch as described below. Specifically, a relay handover may be performed under one of a plurality of UE mobility scenarios, where the UE may be reassigned from a relay node to another network node. Among the plurality of possible mobility scenarios, the most common might be a handover from a relay node to an access node in the same donor cell as the relay node, a handover from a relay node to an access node in a cell different from the donor cell in which the relay node is located, and a handover from one relay node to another relay node. The present disclosure deals with handovers from a relay node to an access node.

To improve the relay handover, one of a plurality of schemes that can be referred to as "smart forwarding" may be used. One such scheme might use synchronous Packet Data Convergence Protocol (PDCP) Sequence Numbers (SNs) for interfaces between the access node, the relay node, and the UE, and might include sending a PDCP status report from the relay node to the access node. Another relay handover scheme may include early S1 path switching using a proxy S1 termination point at the access node before S1 path switching and early termination of access node relay transmissions. Details of these smart forwarding schemes can be found in U.S. Provisional Patent Application No. 61/218,905, filed Jun. 19, 2009, by Rose Qingyang Hu, et al, entitled "Mechanism for Data Handling During a Relay Handover with S1 Termination at Evolved Universal Terrestrial Radio Access Network Access Node", which is incorporated by reference herein as if reproduced in its entirety. In order to clarify the present disclosure, a brief summary of these schemes will now be provided.

Figure 3:
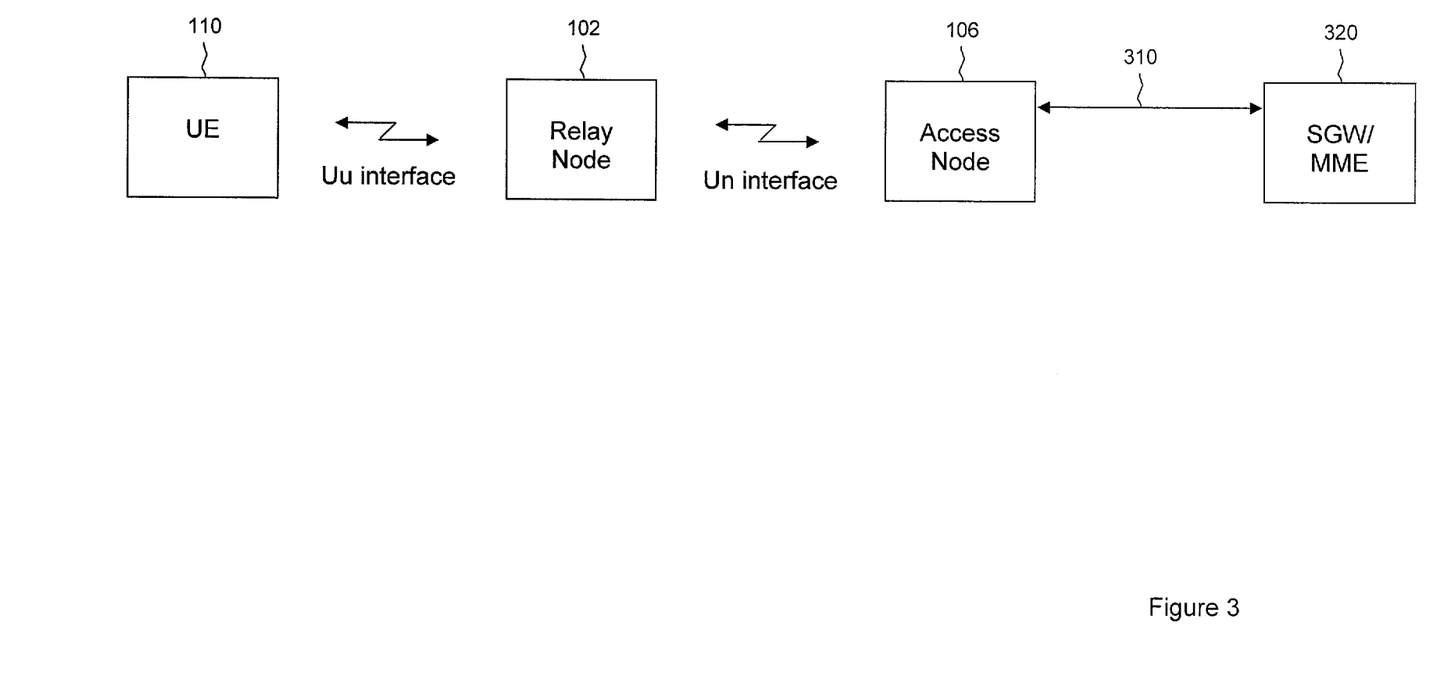
FIG. 3 is a diagram illustrating another wireless communication system that includes a relay node, according to an embodiment of the disclosure.

FIG. 3 illustrates an embodiment of an S1 path 310 terminated at the access node 106. The S1 path 310 may be established between the access node 106 and a serving gateway (SGW)/mobility management entity (MME) 320 or a similar component. The SGW/MME 320 may allow the UE 110 to communicate with an external network. Data packets may be directed or tunneled between the SGW/MME 320 and the access node 106, which may forward the packets to and from the UE 110 via the relay node 102.

Figure 4:
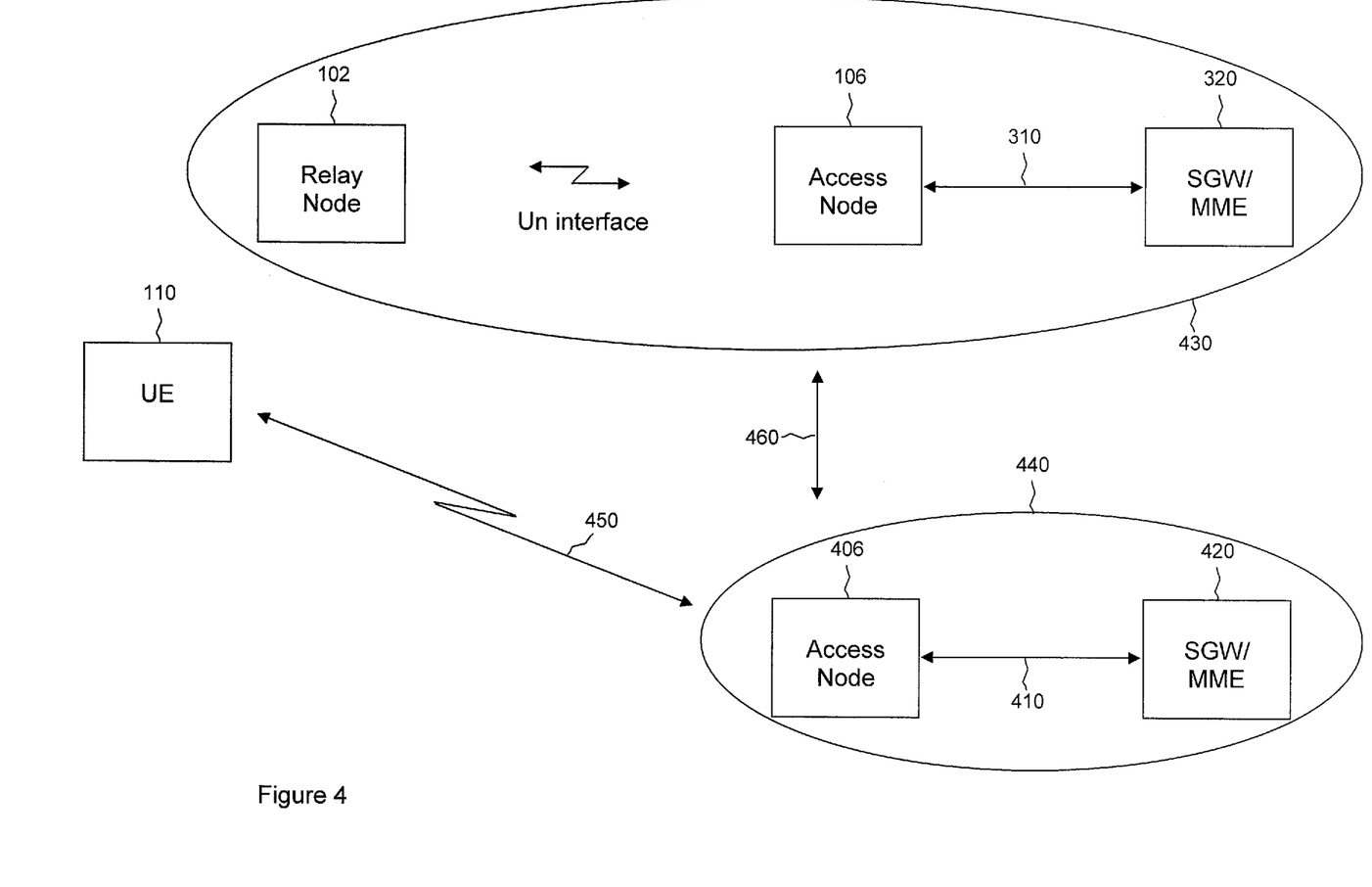
FIG. 4 is a diagram illustrating an S1 path switch, according to an embodiment of the disclosure.

If the UE 110 moves from one cell to another cell, the UE 110 may need to be handed over from the relay node 102 to an access node other than the access node 106 with which the relay node 102 is currently in communication. That is, an S1 path switch may be performed to establish a new S1 path terminated at a target access node instead of at the donor access node 106. This is illustrated in FIG. 4, where the UE 110 that has been in communication with the donor access node 106 via the relay node 102 is being handed over to a target access node 406 in a cell 440 different from the donor cell 430 in which the donor access node 106 and the relay node 102 are located. The old S1 path 310 between the donor access node 106 and the SGW/MME 320 is dropped, and a new S1 path 410 is established between the target access node 406 and its associated SGW/MME 420. The UE 110 then communicates over wireless path 450 with the target access node 406. The SGW/MME 320 and the SGW/MME 420 may or may not be the same entity. The donor access node 106 and the target access node 406 may communicate with one another over a path 460 known as the X2 interface. If the X2 interface is not available, the donor access node 106 and the target access node 406 may communicate over the S1 interface via EPC.

As described in detail in U.S. Provisional Patent Application No. 61/218,905 cited above, the access node 106 may be configured to be aware of the PDCP SDUs and/or any data received by the UE 110, for instance using synchronous PDCP SNs and a PDCP status report. In a handover procedure under such a configuration, the donor access node 106 may forward the data to the target access node 406 without redundant data forwarding from the relay node 102 to the donor access node 106.

Figure 5:
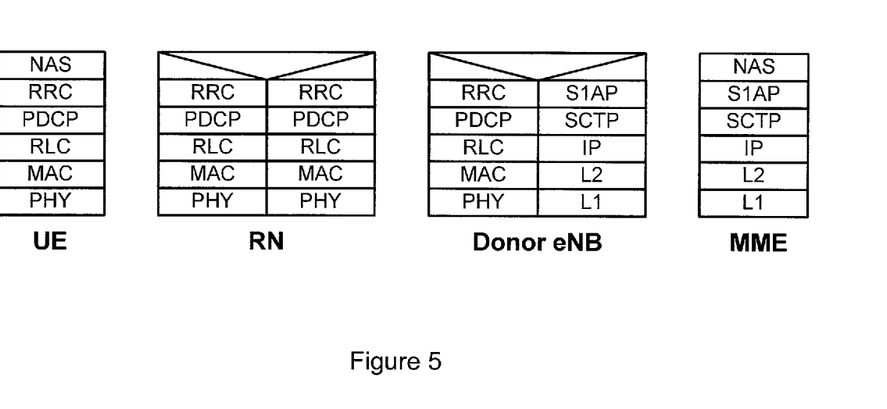
FIG. 5 is a diagram illustrating a control plane for an architecture where the S1 path terminates at an access node, according to an embodiment of the disclosure.
Figure 6:
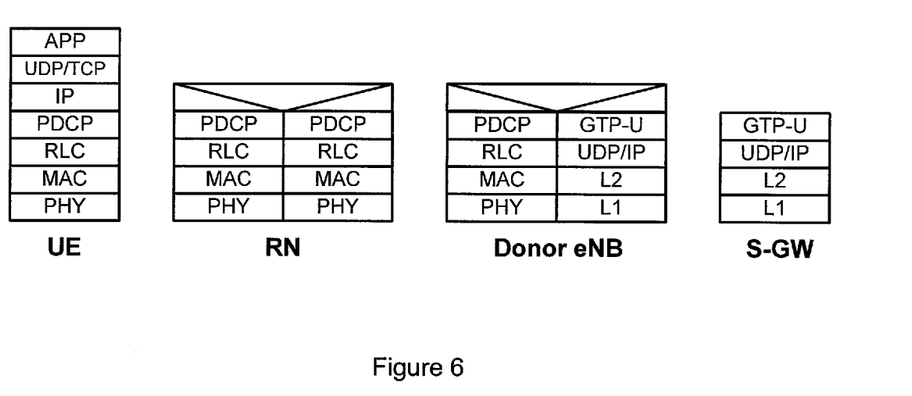
FIG. 6 is a diagram illustrating a user plane for an architecture where the S1 path terminates at an access node, according to an embodiment of the disclosure.

The present disclosure provides an embodiment of a handover mechanism when such synchronous PDCP protocols are used to perform smart forwarding in an architecture where the user plane and control plane of the S1 interface terminate at the donor access node 106. The control plane and user plane for this architecture are illustrated in FIGS. 5 and 6, respectively.

In this architecture, the S-GW 320 serving the UE 110 maps the incoming IP packets to the GTP tunnels corresponding to the EPS bearer of the UE 110 and sends the tunneled packets to the IP address of the donor access node 106. Upon the donor access node 106 receiving the tunneled packets from S-GW 320, the received packets are de-tunneled, and the user IP packets are mapped to the Un radio bearers corresponding to the EPS bearer of the UE 110. Each EPS bearer of the UE 110 connected to the relay node 102 is mapped to a separate radio bearer over the Un interface. It is also possible that multiple EPS bearers from different UEs with the similar QoS may be mapped to the same Un radio bearer.

In this architecture, a logical flow ID can be established between peer PDCP entities at the donor access node 106 and the relay node 102 to uniquely identify a particular UE and radio bearer combination. This mapping of a logical flow ID to a UE/radio bearer combination can be done through signaling, such as RRC signaling between the donor access node 106 and the relay node 102, when a new radio bearer is added on the Uu interface for the UE 110. In one example, this mapping configuration can be encoded in the RRCConnectionSetup, RRCConnectionreconfiguration, or RRCConnectionReestablishment. In another example, the mapping configuration could be included in the IE LogicalChannelConfig or MAC-MainConfig or other RRC Information Elements.

Figure 7:
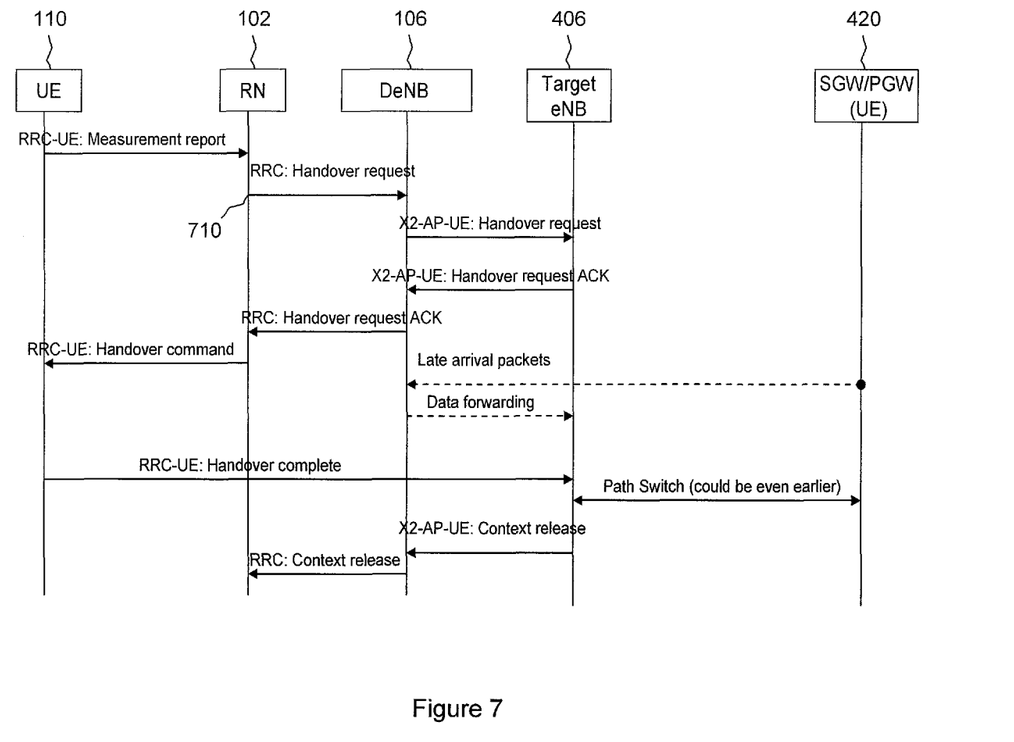
FIG. 7 is a diagram illustrating a handover procedure from a relay node to an access node in a first architecture, according to an embodiment of the disclosure.

FIG. 7 illustrates an embodiment of a handover procedure under this architecture for a synchronous PDCP protocol during a relay mobility scenario in which the UE 110 is moving from the relay node 102 to a target access node other than the donor access node 106 with which the relay node 102 communicates. For example, the UE 110 might be handed over to the access node 406 of FIG. 4. At event 710, the relay node (RN) 102 sends a Handover request message to the donor access node (referred to here as the donor eNB or DeNB 106). The Handover request message contains context information, which includes at least the UE logical flow ID and the relay node radio bearer configuration information.

After receiving the context information in the Handover request message, the DeNB 106 is able to identify the buffered packets that belong to the UE 110 that initiated the handover. To do so, the DeNB 106 first identifies the PDCP queue that the UE 110 belongs to based on the RN radio bearer configuration information. The DeNB 106 then checks the logical flow ID of each packet in the PDCP buffer to identify the packets that belong to the UE 110 that triggered the handover and thus need to be handed over. All the buffered packets that are identified above are forwarded to the target access node (referred to here as the target eNB 406) when the Handover request acknowledgement is received from the target eNB 406.

In this architecture, the DeNB 106 has access to each UE radio bearer. To further reduce the DeNB's processing time and to facilitate per-UE radio bearer-based flow control, each UE bearer may have its own PDCP subqueue within the RN radio bearer level PDCP queue. The DeNB 106 identifies this PDCP subqueue based on the logical flow ID. All the packets in the subqueue corresponding to the logical flow ID that initiates the handover are forwarded to the target eNB 406. For late arriving packets, the DeNB 106 can access the UE radio bearer and identify the packets belonging to the handover UE 110. The DeNB 106 may forward all the buffered packets and late arrivals to the target eNB 406 when the Handover request acknowledgement is received from the target eNB 406. The packets are forwarded to the target eNB 406 either directly via the X2-U interface or indirectly via the S1-U interface.

Figure 8:
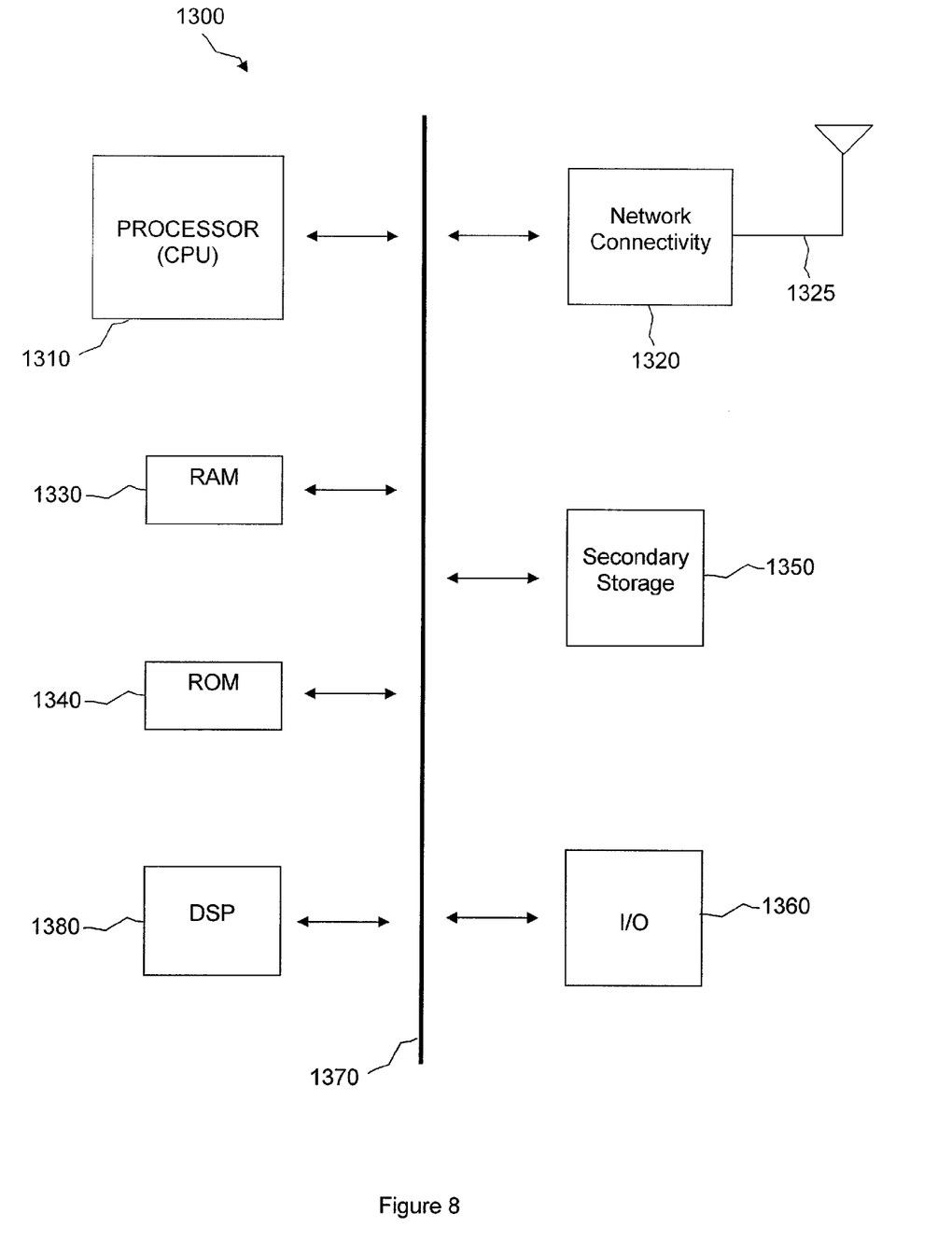
FIG. 8 illustrates a processor and related components suitable for implementing the several embodiments of the present disclosure.

The UE 110, the relay node 102, the access node 106, and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3GPP TS 36.300, 3GPP TS 36.331, 3GPP TS 36.814, and 3GPP TS 36.912.

In an embodiment, a method for handing over a user equipment (UE) is provided. The method includes a donor access node with which the UE is in communication via a relay node receiving context information from the relay node. The method further includes the donor access node using the context information sent by the relay node to identify data packets that belong to the UE.

In another embodiment, a donor access node is provided. The donor access node includes a component configured such that the donor access node receives context information from a relay node via which the donor access node is in communication with a user equipment (UE), and such that the donor access node uses the context information to identify data packets that belong to the UE.

In another embodiment, a method for handing over a user equipment (UE) is provided. The method includes a relay node sending context information to a donor access node with which the UE is in communication via the relay node, wherein the donor access node uses the context information to identify data packets that belong to the UE.

In another embodiment, a relay node is provided. The relay node includes a component configured such that the relay node sends context information to a donor access node that is in communication with a user equipment (UE) via the relay node, the donor access node using the context information to identify data packets that belong to the UE.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for handing over a user equipment (UE), comprising:
   a donor access node with which the UE is in communication via a relay node receiving context information from the relay node; and
   the donor access node using the context information to identify data packets that belong to the UE,
   wherein the context information includes at least one of:
      a UE logical flow identifier; or
      relay node radio bearer configuration information,
   wherein the UE logical flow identifier is mapped to a combination of a UE and a radio bearer through radio resource signaling between the donor access node and the relay node,
   wherein the mapping is encoded in at least one RRC message; and
   wherein the donor access node is configured to support handing over the UE to a target access node using at least one of:
      a proxy S1 termination point at the access node; or
      an early S1 path switch from a first S1 path to a second S1 path, the first S1 path being terminated at the donor access and the second S1 path being terminated at the target access node and wherein the early S1 path switch comprises sending a path switch request before the handover of the UE to the target access node is complete.

2. The method of claim 1, wherein the data packets are forwarded from the donor access node to the target access node.

3. The method of claim 1, wherein the donor access node, based on the relay node radio bearer configuration information, identifies a Packet Data Convergence Protocol queue to which the UE belongs and checks the UE logical flow identifier of each data packet in the Packet Data Convergence Protocol queue to identify the data packets that belong to the UE.

4. The method of claim 3, wherein each UE radio bearer, based on the UE logical flow identifier, has its own PDCP sub-queue within the RN radio bearer level PDCP queue.

5. The method of claim 1, wherein the at least one RRC message is signaled between the donor access node and the relay node when a new radio bearer is added on a Uu interface for the UE.

6. A donor access node, comprising:
   a processor configured such that the donor access node receives context information from a relay node, the donor access node communicating with a user equipment (UE) via the relay node, and further such that the donor access node uses the context information to identify data packets that belong to the UE, wherein the context information includes at least one of:
a UE logical flow identifier; or
relay node radio bearer configuration information, wherein the UE logical flow identifier is mapped to a combination of a UE and a radio bearer through radio resource signaling between the donor access node and the relay node, wherein the mapping is encoded in at least one RRC message; and wherein the donor access node is configured to support handing over the UE to a target access node using at least one of:
a proxy S1 termination point at the access node; or
an early S1 path switch from a first S1 path to a second Si path, the first S1 path being terminated at the donor access and the second S1 path being terminated at the target access node and wherein the early S1 path switch comprises sending a path switch request before the handover of the UE to the target access node is complete.

7. The donor access node of claim 6, wherein the data packets are forwarded from the donor access node to the target access node.

8. The donor access node of claim 6, wherein the donor access node, based on the relay node radio bearer configuration information, identifies a Packet Data Convergence Protocol queue to which the UE belongs and checks the UE logical flow identifier of each data packet in the Packet Data Convergence Protocol queue to identify the data packets that belong to the UE.

9. The donor access node of claim 8, wherein each UE radio bearer, based on the UE logical flow identifier, has its own PDCP sub-queue within the RN radio bearer level PDCP queue.

10. The donor access node of claim 6, wherein the at least one RRC message is signaled between the donor access node and the relay node when a new radio bearer is added on a Uu interface for the UE.

11. A method for handing over a user equipment (UE), comprising:
a relay node sending context information to a donor access node with which the UE is in communication via the relay node, wherein the donor access node uses the context information to identify data packets that belong to the UE, wherein the relay nodes sends the context information in a handover request message to the donor access node, wherein the context information includes at least one of:
a UE logical flow identifier; or
relay node radio bearer configuration information, wherein the UE logical flow identifier is mapped to a combination of a UE and a radio bearer through radio resource signaling between the donor access node and the relay node, wherein the mapping is encoded in at least one RRC message; and wherein the donor access node is configured to support handing over the UE to a target access node using at least one of:
a proxy S1 termination point at the access node; or
an early S1 path switch from a first S1 path to a second S1 path, the first S1 path being terminated at the donor access and the second S1 path being terminated at the target access node and wherein the early S1 path switch comprises sending a path switch request before the handover of the UE to the target access node is complete.

12. The method of claim 11 wherein the data packets are forwarded from the donor access node to the target access node.

13. The method of claim 11, wherein the donor access node, based on the relay node radio bearer configuration information, identifies a Packet Data Convergence Protocol queue to which the UE belongs and checks the UE logical flow identifier of each data packet in the Packet Data Convergence Protocol queue to identify the data packets that belong to the UE.

14. The method of claim 13, wherein each UE radio bearer, based on the UE logical flow identifier, has its own PDCP sub-queue within the RN radio bearer level PDCP queue.

15. The method of claim 11, wherein the at least one RRC message is signaled between the donor access node and the relay node when a new radio bearer is added on a Uu interface for the UE.

16. A relay node, comprising:
a processor configured such that the relay node sends context information to a donor access node that is in communication with a user equipment (UE) via the relay node, the donor access node using the context information to identify data packets that belong to the UE, wherein the relay nodes sends the context information in a handover request message to the donor access node, wherein the context information includes at least one of:
a UE logical flow identifier; or
relay node radio bearer configuration information, wherein the UE logical flow identifier is mapped to a combination of a UE and a radio bearer through radio resource signaling between the donor access node and the relay node, wherein the mapping is encoded in at least one RRC message; and wherein the donor access node is configured to support handing over the UE to a target access node using at least one of:
a proxy S1 termination point at the access node; or
an early S1 path switch from a first S1 path to a second S1 path, the first S1 path being terminated at the donor access and the second S1 path being terminated at the target access node and wherein the early S1 path switch comprises sending a path switch request before the handover of the UE to the target access node is complete.

17. The relay node of claim 16, wherein the data packets are forwarded from the donor access node to the target access node.

18. The relay node of claim 16, wherein the donor access node, based on the relay node radio bearer configuration information, identifies a Packet Data Convergence Protocol queue to which the UE belongs and checks the UE logical flow identifier of each data packet in the Packet Data Convergence Protocol queue to identify the data packets that belong to the UE.

19. The relay node of claim 18, wherein each UE radio bearer, based on the UE logical flow identifier, has its own PDCP sub-queue within the RN radio bearer level PDCP queue.

20. The relay node of claim 16, wherein the at least one RRC message is signaled between the donor access node and the relay node when a new radio bearer is added on a Uu interface for the UE.

* * * * *

UNITED STATES PATENT AND TRADEMARK OFFICE
CERTIFICATE OF CORRECTION

Page 1 of 1

PATENT NO. : 8,804,596 B2
APPLICATION NO. : 12/573015
DATED : August 12, 2014
INVENTOR(S) : Zhijun Cai et al.

It is certified that error appears in the above-identified patent and that said Letters Patent is hereby corrected as shown below:

In the Claims

Claim 6, Column 9, Line 18, replace "Si" with --S1--

Signed and Sealed this
Twentieth Day of January, 2015

Michelle K. Lee
*Deputy Director of the United States Patent and Trademark Office*